Feb. 18, 1969 M. C. BECKER 3,428,867

METHODS AND APPARATUS FOR CONTROLLING THE USEFUL MAGNETOMOTIVE FORCE OF A PERMANENT MAGNET

Filed Feb. 12, 1959

INVENTOR
MAXIMILIAN C. BECKER.
BY
Angelo M. Pisarra
ATTORNEY

INVENTOR.
MAXIMILIAN C. BECKER
BY
Angelo M. Pisarra
ATTORNEY.

United States Patent Office 3,428,867
Patented Feb. 18, 1969

3,428,867

METHODS AND APPARATUS FOR CONTROLLING THE USEFUL MAGNETOMOTIVE FORCE OF A PERMANENT MAGNET

Maximilian C. Becker, 22 Roosevelt Blvd., Florham Park, N.J. 07932

Continuation-in-part of application Ser. No. 425,588, Apr. 26, 1954. This application Feb. 12, 1959, Ser. No. 792,729
U.S. Cl. 317—123 10 Claims
Int. Cl. H01h *47/00, 47/02;* H01f *13/00*

ABSTRACT OF THE DISCLOSURE

The useful magnetomotive force of a permanent magnet is controlled by modifying the magnetic field between the ends of the magnet.

This application is a continuation-in-part of my application Serial No. 425,588, filed April 26, 1954, now abandoned, which in turn is a continuation-in-part of my application Serial No. 229,122, filed May 31, 1951, now abandoned.

This invention relates to magnets and to methods and means for controlling the magnetic characteristics thereof. In one of its more specific aspects, the invention is directed to methods and means for controlling the magnetomotive force of a permanent magnet and the magnetic field between the ends of a permanent magnet.

Heretofore, permanent magnets have been produced with permanent magnet materials. Such magnets have had limited use in the arts and have not been employed at all in many of the arts because no one prior to this invention considered it possible or feasible to directly control or modify the magnetomotive force of permanent magnets. Consequently, electromagnets were employed in those fields, such as conveyors and the like, where controlling the magnetomotive force of the magnet was a prerequisite of use. The use of electromagnets have had many grave disadvantages well known to the art, examples of which are (1) constantly requiring power input, (2) power failure results in dropping of the load, etc.

Heretofore, it has been proposed to employ permanent magnets in place of electromagnets. The use of permanent magnets for holding also has certain disadvantages, among which have been the following: (a) in time the magnets weaken and their maximum residual magnetic flux cannot fully be used, (b) their magnetic pull has not been readily adjustable, (c) various forms of magnetic shunts were employed for releasing the held object, (d) and as in the use of electromagnets, the work held frequently becomes magnetized and must be demagnetized with external means for removal.

A recently issued patent, Duby 2,348,967 of May 16, 1944, discloses the use of a permanent magnet for holding, and proposes to release a load from the permanent magnet without modifying the permanent magnet but creating an opposing flux whereby the load is dropped.

An object of this invention is to provide novel methods and apparatus for controlling the magnetomotive force of a permanent magnet in a simple manner so that the advantages of both electromagnet and permanent magnets are retained while obviating some of their disadvantages.

Another object of my invention is to provide novel methods and apparatus for controlling the magnetomotive force of a permanent magnet whereby it may be so modified that at least a material part thereof may be short circuited on the permanent magnet itself.

Another object of my invention is to provide novel methods and apparatus for modifying a permanent magnet to convert only the outer marginal part thereof to a permanent magnet whose ends are opposite to the polarity of the center of said permanent magnet whereby the flux is short circuited.

Another object of the invention is to provide novel and simple methods and apparatus which are cheap and efficient for controlling the magnetomotive force of a permanent magnet and adapted to be operated by the standard commercially available sources of electric power, such as the common 120 volt, 60 cycle alternating current, storage batteries, etc.

Another object of my invention is to provide a novel, simple and reasonably inexpensive holding device whose magnetomotive force at the end pieces may be reduced and then increased.

At present there are commercially available a variety of different permanent magnets which are well known to the art and are characterized by their high coercive force. Those permanent magnets with which this invention is concerned are those having one or more permanent magnet elements, with each of said elements having a coercive force of at least about 480 and preferably at least about 900 ampere turns per inch. Examples of some of them are the premanent magnets known to the art as "Alnico I," "Alnico II," "Alnico III," "Alnico IV," "Alnico V," "Alnico VI," "Alnico VII," "Cunife I," "Cunico," "Indox," "Hicobalt," "Indalloy," and "Remalloy," and all of the foregoing with the exception of the last three have a coercive force of at least about 900 ampere turns per inch while the last three have a coercive force of about 480 ampere turns per inch.

According to this invention I have devised an entirely different principle by providing novel methods and means for controlling the magnetomotive force of permanent magnets each of which may be a single permanent magnet element or a plurality of such elements magnetically connected in series and/or parallel relationship, so that now they may be used in practically all places where electromagnets had been used before and to great advantage in those fields. By employing my invention it is possible to closely control the magnetic characteristics of permanent magnets. For example, with my invention it is possible to easily and readily modify at will the normal permanent magnet having a north and south pole at the respective ends thereof to produce one having both ends of the same polarity, to vary the north and south character of the permanent magnet to any place between the north and south poles and also to change the polarity of only a portion of the depth of the permanent magnet to provide both a north and south pole at the same end thereof.

These and other objects and advantages of this invention will be readily apparent from the following description and appended drawings, wherein.

Figure 1:
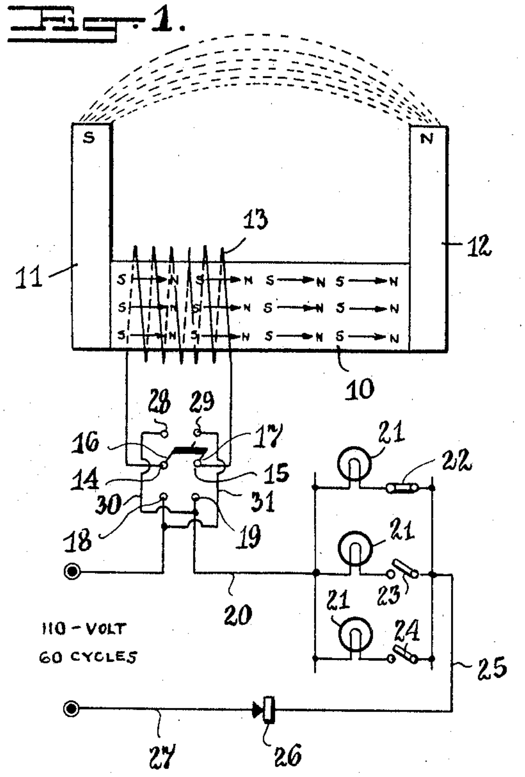
FIG. 1 is a diagrammatic view of a permanent magnet together with pole shoes in combination with electrical apparatus and embodying the invention.
Figure 12:
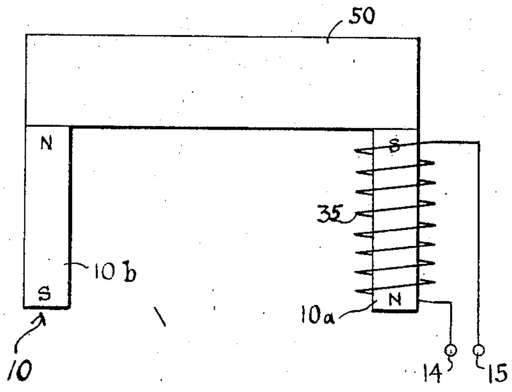

FIG. 12 is a diagrammatic view of a pair of permanent magnet elements magnetically coupled with a soft iron element whereby said permanent magnet elements are coupled together in series to provide a permanent magnet which is modification of the magnet 10 of FIG. 1 and shows a coil wound around one of the permanent magnet elements, and the leads 14 and 15 of said coil are to be coupled to the knife blades 16 and 17 of the electrical apparatus shown in FIG. 1.

Figure 13:
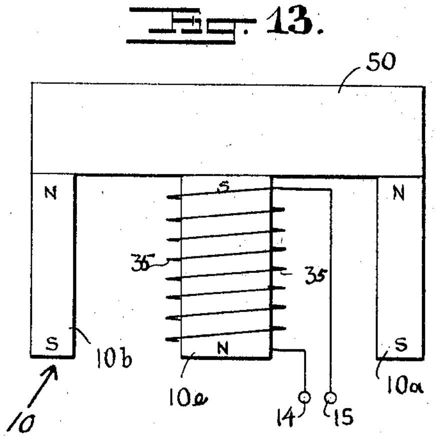

FIG. 13 is a diagrammatic view similar to that shown in FIG. 12 and is a modification thereof in that there is a permanent magnet element disposed between the pair of such elements shown in FIG. 12 and the coil is wound around the central permanent magnet element.

Figure 14:
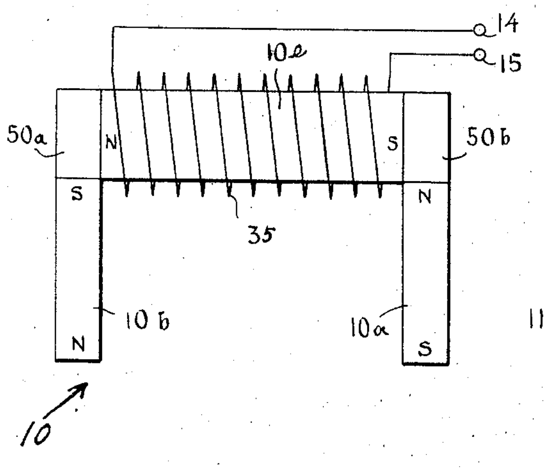

FIG. 14 is still another modification of the entire apparatus shown in FIG. 1 and in this instance three separate magnet elements, instead of two of such elements in FIG. 12, are in series relationship.

Figure 15:
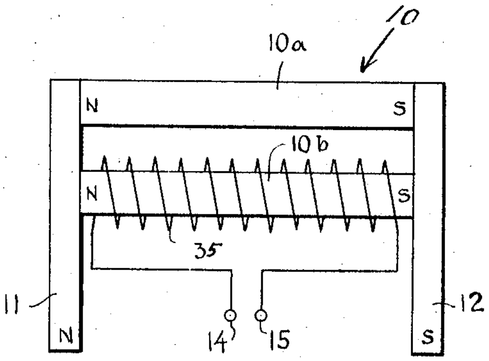

FIG. 15 is still another modification of the entire apparatus as shown in FIG. 1, and in this instance a plurality of separate permanent magnet elements are arranged magnetically parallel to each other, and in such arrangement provide a permanent magnet which is a modification of permanent magnet 10 of FIG. 1.

Figure 16:
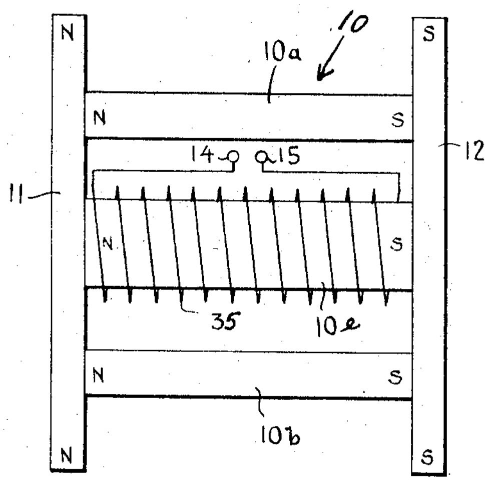

FIG. 16 is a view similar to FIG. 15 and differs therefrom only in that three separate permanent magnet elements rather than two of them are arranged in magnetically parallel relationship with respect to each other.

Figure 17:
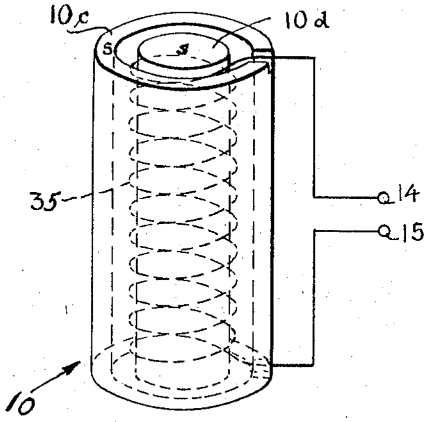

FIG. 17 is a perspective view of another modification of magnet 10 of FIG. 1 with a coil surrounding the inner permanent magnet element.

As shown in FIG. 1 there is a permanent magnet 10, which in this embodiment is a single permanent magnet element, in the form of a bar or rod and composed of any desired permanently magnetizable material such as any one of those heretofore identified and preferably one having a coercive force of at least 900 ampere turns per inch and for the purpose of illustration being "Alnico V" which has been permanently magnetized in the manner known to the art. The permanent magnet 10 may be regarded as a plurality of infinitesimal magnets called domains and illustrated by arrows, in stacked relationship with each of them having a north and south pole and all being parallel to each other and similarly disposed with the stacks disposed in file along the length of the magnet, with the south pole of each stack being adjacent the north pole of the next adjacent stack. Consequently one end of the magnet 10 is north while its other end is south. A pole shoe 11 is disposed at one end of the magnet 10 and extends outwardly therefrom, and a pole shoe 12 is disposed at the other end of the magnet 10 and extends outwardly therefrom. As shown in FIG. 1 there is a magnetic field between the free ends of the shoes 11 and 12. The shoes 11 and 12 are also composed of magnetic material, such as the various steels, annealed cast iron, and alloys which have a coercive force no greater than about 20 ampere turns per inch, and for the purposes of this example the shoes 11 and 12 are composed of a cold rolled steel having a coercive force less than 15 ampere turns per inch. In the practice of this invention the coercive force of the permanent magnet, such as element 10, is at least 480 and preferably at least approximately 900 ampere turns per inch, and the coercive force of the shoes 11 and 12 is no greater than 20 and preferably no greater than 15 ampere turns per inch.

According to this invention a plurality of turns of an electrical conductor are wound around the permanent magnet 10 to provide coil 13 at the south end thereof and extend approximately one-third to approximately one-half of the length of that magnet at that end. The ends 14 and 15 of coil 13 are electrically connected to a pair of knife contacts 16 and 17 of a double pole double throw switch. A stationary contact 18 is connected to one side of a source of electric supply such as a 110 volt 60 cycle source. Another contact 19 is connected by conductor 20 to a plurality of 25–500 watt common incandescent filament lamps ordinarily arranged in multiple and connected through individual switches 22, 23 and 24 to a conductor 25 connected to one side of a rectifier 26 whose other side is connected to said source of electric supply by conductor 27. Contacts 28 and 29 are connected to contacts 18 and 19 respectively by conductors 30 and 31 respectively.

Figures 2, 3:
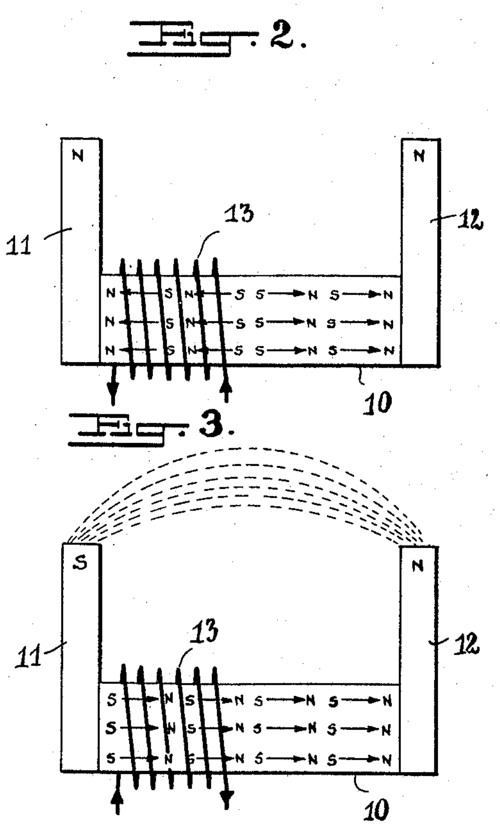
FIG. 2 is a diagrammatic view showing the change in polarity by practicing the invention.
FIG. 3 is a diagrammatic view showing the change in polarity from that shown in FIG. 2 by practicing the invention.

With the novel apparatus and combination as shown in FIG. 1, one or more of the switches 22, 23 and 24 may be closed to pre-condition the electric circuit depending upon the current surge desired in the coil 13 around the permanent magnet 10. Then the knife switch is actuated to place the blades 16 and 17 contiguous with contacts 18 and 19 for a short period of time, a matter of a second or two being sufficient, to make the circuit which may be broken immediately thereafter. When the circuit is first made, there is a very high amperage surge in a predetermined direction through coil 13 due to the resistance of the lamps 21 in the circuit and especially because the filaments thereof are at only room temperature. The lamps serve as a variable resistance which automatically permits an in-rush current flow approximately ten times its normal. The initial high amperage surge over this short period creates an intense electric field about coil 13 which due to its direction controlled by the direction of current flow through the coil 13 as shown in FIG. 2 creates an electromagnetic field substantially parallel to and in a direction opposite to the permanent magnet field, inverts the domains or infinitesimal particles of the magnet 10 at that end thereof encircled by coil 13. This causes approximately one half of the domains to become inverted and now while still extending between south and north are disposed in a direction opposite to the direction of the other domains at the other half of the permanent magnet 10. In this manner I have provided a permanent magnet 10 having two north poles as illustrated in FIG. 2 so that the free ends of both shoes 11 and 12 are north and continue to remain permanently in that condition after the circuit is broken and the blades 16 and 17 are returned to inoperative position. When it is desired to recondition the permanent magnet 10 as heretofore modified and shown in FIG. 2 to its original condition as shown in FIG. 1, the blades 16 and 17 are now placed contiguous with contacts 28 and 29 thereby making another circuit to cause a high amperage surge through coil 13 of a value at least as great and preferably greater than that of the first mentioned surge through coil 13 but in the opposite direction as shown in FIG. 3 to create an opposite electric field of such great intensity as to invert to their original position the initially inverted domains. In this manner the permanent magnet 10 is brought back to its original condition as shown in FIGS. 1 and 3.

By practicing this invention the flux density in the area between the outer or free ends of pole shoes 11 and 12 may be reduced to approximately 0 and this condition is attained when both poles of the permanent magnet 10 are in the N state as shown in FIG. 2. However, by controlling the magnitude of the amperage surge in the conditioning of the permanent magnet, the extent or degree of polarity reversal may be controlled at the will of the operator by merely having the proper resistance lamps 21 in the initial circuit. Thus the useful flux density between the outer ends of the pole shoes 11 and 12 coupled with the permanent magnet 10 may be reduced by any amount and generally 50%, or more preferably as high as about 75–100% for certain usages. When reduced by 100% the condition shown in FIG. 2 is obtained. The great reductions in flux density at the outer or effective ends of the pole pieces 11 and 12 is of great significance especially in the field of holding devices such as chucks, lifts and conveyors, because it permits ready removal of the object originally held thereby even if it had become magnetized, because while the flux density at the outer ends of the pole pieces 11 and 12 is so low the magnet 10 itself is still fully saturated and therefore has only the permeability of air when the reduction of 100% has been attained. Then after the reduction of the useful flux density at the outer ends of the pole pieces 11 and 12, the permanently modified permanent magnet 10 as shown in FIG. 2 may be brought back to its normal condition by controlling the amperage surge in the opposite direction through coil 13. This is preferably done while the outer ends of the pole pieces 11 and 12 are in contact with the load to be held thereby. Because it is in contact with the load at that time, the magnet 10 retains its maximum residual flux density.

Figure 4:
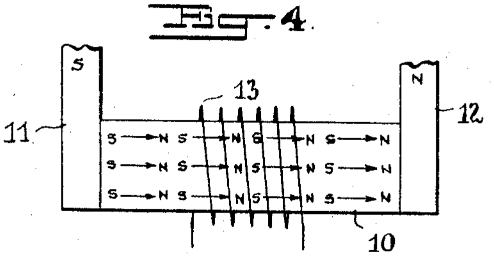
FIG. 4 is a fragmentary diagrammatic view similar to FIG. 1 but with part of the apparatus omitted.
Figure 5:
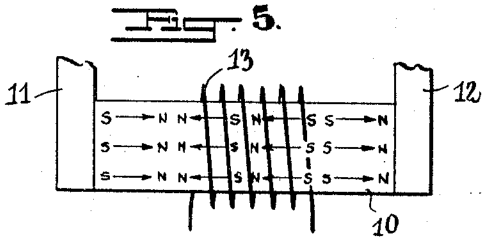
FIG. 5 is a view similar to FIG. 4 and shows the change in polarity at a section of the permanent magnet between the ends thereof while the polarity at the ends remains substantially unchanged.
Figure 6:
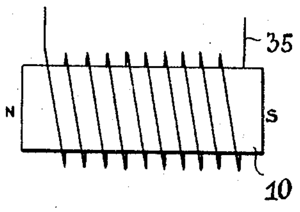
FIG. 6 is a diagrammatic view similar to FIG. 1 except that certain parts are omitted.

If desired the domains at the mid-part or any other part of the permanent magnet 10 may be inverted in the same manner as before by disposing the coil 13 around that portion of the magnet 10 in which this condition is desired. And, the extent of permanent magnet 10 which is to be magneto-inverted is controlled by the length permanent magnet 10 is surrounded by the coil 13 and also the intensity of the applied electric field of course controlled by the magnitude of amperage surge. The inverted domains may be returned to their original position by changing the direction of current flow through the coil 13. FIG. 4 shows the domains of the unmodified ordinary permanent magnet 10 with the coil 13 at the center. FIG. 5 shows the inversion of the domains at the center of permanent magnet 10 after current surge through coil 13 in one direction and FIG. 6 shows their return to original position after current flow in the opposite direction and equal or greater intensity through coil 13. Several coils 13 may be spaced along particularly long permanent magnet 10 and they may be simultaneously or successively energized to change the domains along the length of said magnet to obtain the condition the same as that shown in FIG. 2 and then FIG. 3; or alternatively the coil 13 may be moved from the center as shown in FIG. 4 in short stages along the length of the magnet 10 after each surge.

Figure 7:
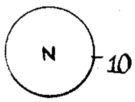
FIGS. 7 and 8 are end views of the permanent magnet shown in FIG. 6.
Figure 8:
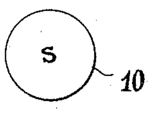
Figure 10:
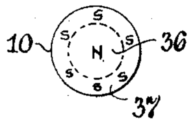
FIGS. 10 and 11 are end views of the permanent magnet of FIG. 9 and are end views of the magnet respectively similar to FIGS. 7 and 8 and differ therefrom in the modification of polarities thereof.
Figure 11:
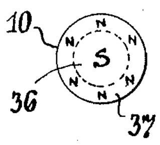

Still another manner of practicing the invention is to employ a coil 35 having a greater number of individual turns around the permanent magnet 10 to cover approximately almost the entire length thereof. By controlling the resistance provided by the lamp 21, the proper number of lamps may be placed in the circuit to determine the amperage surge through coil 35 when the blades 16 and 17 are located to be contiguous with contacts 18 and 19 to make the first circuit whereby the domains through a predetermined depth of the magnet from the outer surface thereof are inverted. When said first circuit is made there is created an electromagnetic field approximately parallel to and opposing the permanent magnet field of magnet 10. The depth of inversion is dependent upon the number of turns in coil 35 and the intensity of amperage surge on making of the circuit. In this manner the permanent magnet 10 is converted from the condition shown in FIGS. 6 and 7 and 8 to the one shown in FIGS. 10 and 11. The so modified magnet 10 as shown in FIGS. 10 and 11 may be described as a pair of concentric magnets with the inner magnet 36 being surrounded by a cylinder magnet 37 with the ends of magnets 36 and 37 adjacent each other being of different polarity. In this condition the flux between 36 and 37 is short circuited therebetween so that there is practically none between the outer ends of the pole pieces 11 and 12. The magnet 10 may be brought back to its original condition as before by sending current surge of the same and preferably of higher intensity back in the opposite direction through coil 35 and preferably while the pole pieces 11 and 12 are in contact with the load.

Whichever of the various methods is used, it is feasable as a practical matter to reduce the magnetomotive force between the effective or outer ends of the pole pieces 11 and 12 of the unmodified permanent magnet 10 by as high as 75–100% and such permanently modified permanent magnets may be restored to their original condition. By modifying the permanent magnet 10, it is now a simple matter to center thereon the object to be held thereby.

By employing this invention permanent magnet chucks, conveyors and lifts may be used and provided with relatively inexpensive apparatus for controlling the magnetomotive force thereof. With such apparatus, with a lift or conveyor for example, all that need be provided is the permanent magnet 10 together with the normal pole shoes 11 and 12 and a coil 13 or 35 at either end of the magnet 10.

The ends of coil 13 or 35 may be connected to a pair of permanently positioned contacts. When a load carried by the pole shoes 11 and 12 reaches its destination, a current surge from a suitable source of EMF such as that shown, batteries or condensers is supplied through the resistance in the form of lamps to reduce the intensity of the magnetic south for example to the desired degree, up to converting it to a north pole as shown in FIG. 2 to obtain two like poles north and north, so the magnetomotive force between the poles is insufficient to hold the load and the load drops. The same ultimate effect may be obtained by employing the method shown in FIGS. 6–11. After the load has been dropped, the permanent magnets 10 may be reconditioned to their original condition as shown and described.

In the manners heretofore described, I have provided novel methods and apparatus for controlling the useful magnetomotive force of a permanent magnet between its poles. This may be readily accomplished at a very inexpensive cost. In the modification of the permanent magnet 10 of FIG 1 to the permanent condition of FIG. 2 and back to its original condition of FIG. 1 the apparatus and power costs were low. With a magnet 10 of "Alnico V" for example which measured one inch by two inches in cross section and being one and one-half inches long, the coil 13 has about 200 turns and the bank lamps 21 is composed of three incandescent tungsten filament lamps of 100, 200 and 300 watts. With all switches 22, 23 and 24 in operative condition, the first circuit is made for only about a couple of seconds to permanently modify the magnet to the condition shown in FIG. 2 and then the second circuit may be made for about the same length of time as shown in FIG. 3 to reconvert it to its original condition. If desired and I prefer that the bank of lamps consist of 1 of 500 watts, another of 250 watts and the other of 100 watts. However, it is also within the contemplation of this invention that at least two lamps and also that three or more be in said bank to provide the necessary wattage to obtain the desired surges through the coil. I prefer in this instance that the appropriate switches 22 and 23 be closed for example to bring the 500 and 100 watt lamps in the circuit to permanently change the permanent magnet 10 from the condition shown in FIG. 1 to that shown in FIG. 2 or from that shown in FIG. 4 to that shown in FIG. 5 or from that shown in FIGS. 6–8 to that shown in FIGS. 9–11, and then when it is desired to convert the magnets 10 to their original conditions the other switch 24 is also made to bring the lamp of 250 watts also in the circuit and the master switch is thrown to make a circuit with current flow in the opposite direction to provide an electromagnetic field of greater intensity than that produced when only lamps of 500 and 100 watts were in the circuit to assure reconversion of the permanent magnet 10 to such a state that the flux therefrom is at least equal to the flux therefrom before modification.

In this particular example, the winding or coil 35 consists of about 220 turns of insulated copper wire of the type used in coil 13. The turns wind around said magnet 10 with the individual turns being disposed in a plane approximately 90° to the virtual center line of the magnet 10 between the poles thereof, and by approximately 90°, of course I mean 60–90°.

Figure 9:
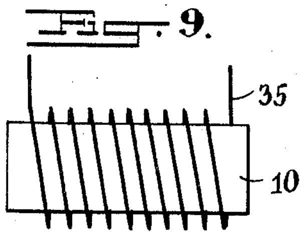
FIG. 9 is a view similar to FIG. 6.

If desired a simple and very effective holding device may be constructed by merely employing a base which if desired may be composed of brass, bronze or other suitable non-magnetic material. The base may be in the form of a rectangular section of appropriate thickness for strength and having coupled therewith bolts or other devices for detachably anchoring it to a conveyor belt, lift, lathe or milling machine. A pair of shoes 11 and 12 rest on and are secured to the base by non-magnetic bolts extending through the base and into the lower part of the shoes 11 and 12. The permanent magnet 10 of FIGS. 1–6 and 9 extends between the shoes 11 and 12, with the one pole thereof being contiguous with a face of the shoe 11 and its other pole being contiguous with a face of shoe 12. The permanent magnet 10 of FIGS. 1–6 and 9 has a coil 13 disposed therearound as shown in FIGS. 1 or 4 but preferably has a coil 35 as shown in FIGS. 6 and 9 disposed therearound, and the magnet 10 is spaced from the base to allow the coil employed to be accommodated. Such a combination may have the space between the pole pieces loaded with a resinous filler and if desired there may be embedded in the filler a plurality of strips of magnetic material similar to the pole pieces and disposed between the outer ends of the pole shoes 11 and 12 and extending a short distance below the upper face of the filler, but with the outer faces thereof being exposed and in the same plane as the outer surfaces of the free ends of the pole pieces. The ends of the coil employed may be extended through the filler and secured to a female electrical plug anchored to the filler to provide a ready means for coupling and uncoupling the circuit arrangement outside of said magnet thereto through a male plug when desired.

In the use of these various devices and especially for holding purposes the load is, of course, of magnetic material and is placed across the outer ends of the poles 11 and 12. Then I prefer to place all of the lamps in the circuit and throw the switch to provide an electromagnetic field through coil 13 or 35 which is parallel to and in the same direction as the permanent magnet field of the permanent magnet 10. By this means I obtain maximum holding power because the magnetic circuit is closed during the period that the electromagnetic field is produced. When it is desired to remove the load from the outer ends of the poles 11 and 12 the proper number of lamps are placed in the circuit and the switch is thrown in the opposite direction to provide an electromagnetic field in approximately the same path and in the opposite direction to said first mentioned electromagnetic field and of sufficient intensity to reduce permanently by at least 50%, and for most purposes 75–100%, the permanent magnetic field between the outer ends of the poles 11 and 12 whereby the load may be easily removed by either dropping off by itself if sufficiently heavy or upon exertion of normal human force. Thereafter another load may be placed in contact with and across the effective ends of the poles 11 and 12 and with the same number of lamps, that is the same wattage and preferably with lamps to provide at least 25% more wattage, the switch is again thrown and in this case the electromagnetic field established at the coil 13 or 35 is in approximately the same path as, of at least the same intensity and preferably of greater intensity than, and in a direction opposite to the direction of said second mentioned magnetic field to restore the original magnetic field between the outer ends of the pole pieces to at least its original value. The resistance of the lamps employed provide a cheap and readily replaceable resistance having a high resistivity characteristic at incandescence approximately 10 times its resistivity at room temperature and is further characterized as being capable upon passage of sufficient current therethrough to become heated to incandescence in a very short period of time so that a high in-rush current is obtainable in coil 13 or 35.

It is also within the purview of this invention to employ various modifications of the permanent magnet 10 in FIG. 1. Said permanent magnet 10 as shown in FIG. 1 is a single permanent magnet element, as it is in FIGS. 2–6 and 9. While the permanent magnet 10 is shown as a single permanent magnet element, it, of course, is obvious to those skilled in the art to which this invention is addressed, that the permanent magnet employed may, when desired, be of two or more permanent magnet elements and such elements may be in series and/or parallel relationship. Some of such modifications are shown in FIGS. 12–17 by way of illustration and not limitation. The possibly most obvious equivalents of a permanent magnet consist of such single permanent magnet element in FIG. 1, is such an element which has been divided along either the length and/or thickness thereof to provide a plurality of parts which are assembled together in any convenient manner to provide a permanent magnet consisting of a plurality of individual and separate permanent magnet parts or elements coupled together so as to act as a single permanent magnet element.

Some of the specific modifications which may be used, and in which, if desired the pole pieces 11 and 12 may or may not be eliminated depending upon the design required are those shown in FIGS. 12–15.

In the modification shown in FIG. 12, the magnet 10 is U shaped and consists of a plurality of separate same size, permanent magnet elements **10*a* and 10*b* spaced from and connected to each other in series relationship through a magnetic material, such as a soft iron bar 50, having a very low coercive force. The entire length of element 10*a* is located in the central opening of coil 35**.

In the modification shown in FIG. 13, the permanent magnet 10 is of double U shape and is essentially the same as that shown in FIG. 12, except that instead of employing a permanent magnet 10 consisting of only the two permanent magnet elements **10*a* and 10*b* connected in series by the soft iron bar 50, another permanent magnet element 10*e* is disposed between the permanent magnet elements 10*a* and 10*b* so as to be in series relationship with each of elements 10*a* and 10*b*, each of which elements 10*a* and 10*b* in all of the modifications herein are preferably one-half the size of the permanent magnet element 10*e*. As shown the entire length of the permanent magnet 10*e* is located in the central opening of coil 35**.

The modification shown in FIG. 14 represents still another embodiment af this invention. As shown there is a permanent magnet 10 of U shape and consists of permanent magnet element **10*e* in series with the permanent magnet elements 10*a* and 10*b* through a pair of soft iron couplers 50*a* and 50*b*. In this embodiment permanent magnet 10 is U shaped like permanent magnet 10 of FIG. 12, but differs therefrom in that element 10*e* may be regarded as the cross-piece of the U. If desired, the soft iron couplers 50*a* and 50*b* may be eliminated and in such case, the side faces of the ends of the elements 10*a* and 10*b* may be placed contiguous with the end faces of the element 10*e*. The entire length of the element 10*e* is located in the central opening of coil 35**.

In the modification shown in FIG. 15, the permanent magnet 10 consists of a plurality, and as shown, two permanent magnet elements **10*a* and 10*b* spaced from and connected to each other in parallel relationship by a pair of pole pieces 11 and 12. The entire length of the element 10*b* is located in the central opening of coil 35**.

The modification shown in FIG. 16 is essentially the same as that shown in FIG. 15 except that there are three permanent magnet elements **10*a*, 10*e* and 10*b* spaced from each other in that order and connected to each other in parallel relationship by a pair of pole pieces 11 and 12 whose ends extend beyond the elements 10$a$ and 10$b$ to provide two pairs of pole ends. In this embodiment 10$e$ is located between 10$a$ and 10$b$ and the entire length thereof is located in the central opening of coil 35**.

In the modification shown in FIG. 17, permanent magnet 10 consists of permanent magnet element 10$c$ in the form of a hollow tube and permanent magnet element 10$d$ in the form of a rod which is located in and spaced from element 10$c$. The entire length of element 10$d$ is located in coil 35, whose ends extend through slots in element 10$c$ so that pole pieces, such as 11 and 12 of FIG. 1 may be coupled to the ends of 10$c$ and 10$d$ in the same manner as the single permanent magnet element of FIG. 1 is coupled to said pole pieces.

In all of the aforesaid embodiments as shown in FIGS. 1–6 and 9, the permanent magnet structure 10 employed consists of a single permanent magnet element, while the permanent magnet structure 10 shown in FIG. 12 consists of three elements, namely, element 50 connecting permanent magnet elements 10$a$ and 10$b$ in series relationship. Of course, the elements 10$a$ and 10$b$ may be placed in line with each other with the N pole of 10$b$ contiguous with or separated from the S pole of 10$a$ preferably by a small soft iron spacer if desired to provide a permanent magnet structure physically similar to that of FIG. 1 and differs therefrom essentially in that the permanent magnet structure 10 now consists of two elements rather than only one. The permanent magnet structure 10 shown in FIG. 14 consists of five elements, namely permanent magnet element 10$e$ magnetically coupled in series with permanent magnet elements 10$a$ and 10$b$ by soft iron blocks 50$a$ and 50$b$; and if desired a magnetic structure 10 similar to that of FIG. 14 may be achieved by the elimination of the blocks 50$a$ and 50$b$ and having one side of the upper end of 10$b$ contiguous with the left hand end face of 10$e$ and a side of the upper end of 10$a$ contiguous with the right hand end face of 10$e$. The permanent magnet structure 10 illustrated in FIG. 13 consists of four parts, namely, three permanent magnet elements 10$a$, 10$b$ and 10$e$, with 10$e$ connected in series to 10$a$ and 10$b$ through bar 50. The permanent magnet structure 10 shown in FIG. 15 consists of four parts namely, a pair of permanent magnet elements 10$a$ and 10$b$ connected to each other in magnetic parallel relationship through magnetic materials, which may be pole pieces 11 and 12. The magnetic structure 10 shown in FIG. 16 consists of five parts, namely, three permanent magnet elements 10$a$, 10$b$ and 10$e$ spaced from and connected to each other in magnetic parallel relationship through two magnetic elements, which may be pole pieces 11 and 12. The permanent magnet structure 10 shown in FIG. 17 consists of a pair of permanent magnet elements 10$c$ and 10$d$ separated from each other and may be connected together by magnetic materials, such as pole pieces 11 and 12 of FIG. 1.

The structures, diagramatically and schematically, illustrated in FIGS. 12–17 may be operated in a number of different manners within the teachings of the present invention. For example, after pre-conditioning by closing one or more of the switches 22, 23 and 24, depending upon the current surge desired in the coil around the permanent magnet element, the switch is actuated so that the blades 16 and 17 thereof are contiguous with contacts 18 and 19 to "make" an electric circuit comprising the source of direct current, resistance of lamp or lamps 21 and coil 35. When the circuit is first made there is a very high amperage surge in a pre-determined direction through coil 35 of FIGS. 12, 13, 14, 15, 16 or 17 whereby an intense electric field is created about coil 35 thereby creating a surge or in-rush electromagnetic field in the same path as and in a direction opposite to the permanent magnetic field of the permanent magnet element 10$a$ of FIG. 12, 10$e$ of FIG. 13, 10$e$ of FIG. 14, 10$b$ of FIG 15, 10$e$ of FIG. 16 or 10$d$ of FIG. 17 and of sufficient intensity to materially reduce, and in general to reduce by at least 50%, permanently, the permanent magnetic field of said element in its original direction between and outside the ends of said element, thereby to materially reduce permanently the useful magnetomotive force of said permanent magnet 10 of FIG. 12, FIG. 13, FIG. 14, FIG. 15, FIG. 16 or FIG. 17. The intensity of said in-rush electromagnetic field is preferably at least such intensity as to reverse permanently the polarity of at least a substantial outer marginal portion of said element 10$a$ of FIG. 12, 10$e$ of FIG. 13, 10$e$ of FIG. 14, 10$b$ of FIG. 15, 10$e$ of FIG. 16 or 10$d$ of FIG. 17 over the entire length thereof. Said intensity, if desired, may be such that only a substantial outer marginal portion of said element subjected to said field has its polarity reversed, whereby said element is converted into a pair of permanently magnetized portions with one of said pair being the central core thereof which has remained substantially unchanged and the other of said pair being in the form of a shell substantially completely surrounding said central core and extending the entire length thereof, with the corresponding ends of said central core and shell being of opposite polarity as shown in FIGS. 10 and 11 so that the permanent magnetic field between the ends of the central core is shunted by said modified outer marginal portion, thereby to permanently reduce materially and preferably by at least 50% the permanent magnetic field in its original direction, extending outside of and between the ends of said element and by that I mean extending outside of and from one end of the element to the other. As a consequence therefor, the useful magnetomotive force which, of course, is in the air gap between the effective ends of the permanent magnet 10 or its pole pieces is considerably reduced so that a load which may have been magnetically held to such a holding device may be readily removed therefrom. It is also within the purview of this invention to employ a resistance of the type heretofore described and of such a value as to provide a sufficiently high in-rush current through said coil whereby a sufficiently high in-rush electromagnetive field in the same path and direction as heretofore stated will convert said element 10$a$ of FIG. 12, 10$e$ of FIG. 13, 10$e$ of FIG. 14, 10$b$ of FIG. 15 or 10$d$ of FIG. 17 into a permanent magnet element whose polarity has been substantially completely changed throughout so that the north pole of said element is now substantially completely a south pole and its south pole is substantially completely a north pole. When such a step is employed in the operation of a permanent magnet such as shown in FIG. 12 then the element 10$a$ of FIG. 12 is converted into a permanent magnet element which is substantially the same as 10$b$ thereof and like 10$b$ the pole thereof contiguous with bar 50 has been changed substantially completely from south to north and the free end thereof has been changed substantially completely from north to south so that the useful magnetomotive force in the working air gap between the ends of the permanent magnet 10 is approximately zero. When such a step is employed in the operation of the permanent magnet 10 shown in FIG. 13 the polarity of the element 10$e$ throughout the entire mass thereof is reversed so that the upper end which is now south is substantially completely north throughout and the lower end which is now north is substantially completely south throughout, thus reducing to approximately zero the useful magnetomotive force in the two working air gaps between the elements 10$b$ and 10$e$ and 10$e$ and 10$a$. When such a step is employed in the operation of the permanent magnet shown in FIG. 14 the polarity of the permanent magnet 10$e$ is reversed throughout the entire mass thereof so that the north end is substantially completely south throughout and the south end is subsantially completely north throughout, whereby the useful magnetomotive force in the working air gap between the effective ends of 10$a$ and 10$b$ is also greatly reduced. When such a step is employed in the operation of the permanent magnet 10 shown in FIG. 15, the polarity of 10$b$ is completely reversed so that the north end is changed substantially completely throughout to south and the south end throughout is changed substantially completely throughout to north so that the electromagnetic field of 10*a* and 10*b* become internally shunted through those portions of the pole pieces 11 and 12 connecting them in parallel whereby the useful magnetomotive force in the working air gap between the effective ends of the pole pieces 11 and 12 is reduced to approximately zero. When such a step is employed in the operation of the permanent magnet 10 as shown in FIG. 16, the polarity of the element 10*e* is reversed throughout so that the north end thereof becomes south substantially completely throughout and the south end thereof becomes north substantially completely throughout whereby the electromagnetic fields 10*a*, 10*b* and 10*e* become shunted so that the useful magnetomotive force in the working air gaps between the effective ends of said pole pieces is reduced to approximately zero. When such a step is employed in the operation of the permanent magnet 10 of FIG. 17 the polarity of the element 10*d* is reversed throughout so that the south pole thereof becomes north substantially throughout and the north pole thereof becomes south substantially throughout whereby the electromagnetic fields of elements 10*c* and 10*d* become internally shunted through the ends of the pole pieces (not shown) which are normally attached thereto so that the magnetomotive force in the working air gap between the effective ends of said pole pieces is approximately zero.

It is, of course, obvious that instead of employing a single coil around only one of the elements of each of the permanent magnets 10 as shown in FIGS. 12–17 a coil may be wound around each of the permanent magnet elements thereof and current of such intensity may be passed through each of the coils surrounding the individual elements so as to convert each of said elements into an element such as that shown in FIGS. 10–11, whereby the opposing permanent magnetic fields in each of said elements become internally shunted.

It is also within the purview of this invention to employ a coil around one or more of said permanent magnet elements in order to effectively reduce the permanent magnetic field in its original direction outside of and between the ends thereof by employing a coil measuring about one-third or more of but less than the entire length of said element as illustrated in FIGS. 1 and 2 whereby that portion of the element subjected to the electromagnetic field of said coil is modified in any of the manners heretofore set forth.

Like before, as previously described in the operations concerning FIGS. 1–11 the switch may now be actuated to break the circuit and blades 16 and 17 moved to be contiguous with contacts 18 and 19 to make another circuit with the same number and preferably more lamps 21 in the circuit so that the in-rush current passing through the coil such as 35 or 13 provides an in-rush unidirectional electromagnetic field of at least the same intensity as, in approximately the same path as but in the opposite direction to said first mentioned electromagnetic field whereby the element 10*a* of FIG. 12, 10*e* of FIG. 13, 10*e* of FIG. 14, 10*b* of FIG. 15, 10*e* of FIG. 16 or 10*d* of FIG. 17 is restored permanently to at least its original magnetic condition whereby the useful magnetomotive force in the working air gap or gaps of the permanent magnet 10 is restored to at least its original value.

In all of the structures disclosed, for maximum efficiency, it is preferable that the virtual center line of the coil 13 or 35 be adjacent to or coincidental with the virtual center line of the permanent magnet element located in the center core thereof. In addition, no substantial or large amounts of magnetic material should, in the space outside of the working gap, be placed close to any permanent magnet element of any of the holding devices described. That is to say, that any permanent magnet element of such permanent magnets 10 should, in the space outside of the working gap, be substantially free of the influence of any material amounts of magnetic material which, if present, would reduce materially the useful magnetomotive force in the working air gap between the poles thereof. In addition, the poles should apart from the load, be free of any material amount of magnetic material which, if present, would shunt a material amount of the permanent magnetic field from the working air gap between the effective ends of the pole pieces of the permanent magnet 10.

In accordance with the present invention, it is to be understood that for the sake of efficiency, the coercive force of the connectors and pole pieces 50, 50*a*, 50*e*, 11 and 12 should be no greater than 20 and preferably no greater than 15 turns per inch. Ordinary cold rolled steel is a good practical material for the aforesaid purposes. However magnetic material having a greater coercive force than 20 turns per inch may be employed for the aforesaid purposes and in any case, obviously, the coercive force of such elements is very low when compared with that of the permanent magnet element or elements used in the permanent magnet 10. It is also to be understood that by the expression that "the virtual center line extending from one pole of the permanent magnet to the other and located within the outermost surface thereof" is meant to include both the solid type bar magnets as well as those of hollow cylindrical form as shown in the drawings in that each type has only one virtual center line extending from one pole to the other pole.

Since certain changes may be made in the aforedescribed methods and constructions and different embodiments of the invention could be made without departing from the scope thereof, it is intended that all matter contained in the above description or shown in the accompanying drawing shall be interpreted as illustrative and not in a limiting sense.

I claim:

1. The method for controlling the useful magnetomotive force of a permanent magnet means having a coercivity of at least 480 ampere turns per inch and comprising at least one permanent magnet element, said element having only one virtual center line extending from one pole thereof to the other pole thereof and located within the outermost surface thereof; comprising subjecting said element to a unidirectional electromagnetic field approximately parallel to and opposing the permanent magnetic field of said element and of sufficient intensity to reverse permanently the polarity of at least a substantial outer marginal portion of said element, thereby materially reducing permanently the useful magnetomotive force of said means, and then subjecting said permanently modified element to a unidirectional electromagnetic field of at least the same intensity as and in approximately the same path as said first mentioned electromagnetic field but in the opposite direction to restore said modified element permanently to at least its original magnetic condition for restoring said useful magnetomotive force to at least its original value.

2. A magnetic holding device comprising permanent magnet means composed of material having a coercivity of at least 480 ampere turns per inch, a plurality of pole pieces spaced from each other and composed of material of low coercivity, operatively coupled with said means and defining a working air gap across which a magnetomotive force is supplied thereto by said means, said means comprising at least one permanent magnet element, said element having only one virtual center line extending from one pole thereof to the other pole thereof and located within the outermost surface thereof, a coil having a central opening, with the turns of said coil extending around said element and said virtual center line, said coil extending along at least one-third the length of said element, means for selectively sending electric current in one direction through said coil to provide a unidirectional electromagnetic field approximately parallel to and in the opposite direction to the permanent magnetic field of said element and of sufficient intensity to reverse permanently the polarity of at least a substantial outer marginal portion of said element to reduce materially permanently said useful magnetomotive force supplied by said means, and for sending electric current in another direction through said coil to provide a unidirectional electromagnetic field in approximately the same path as, at least the same intensity as but in the opposite direction to the first mentioned electromagnetic field to restore said permanent magnet element to at least its original magnetic condition for restoring said useful magnetomotive force to at least its original value.

3. A holding device including a permanent magnet element having only one virtual center line between the poles thereof and having a coercive force of at least 480 ampere turns per inch, coupled with pole pieces of magnetic material having a low coercive force compared with that of said element, with said element between the poles thereof being substantially free of the influence of material amount of magnetic material which if present would reduce materially the magnetomotive force between said poles, and said poles being free of material amount of magnetic material which if present would shunt a material amount of the magnetic field from the working air gap between the effective ends of said pole pieces, a coil having central opening, with the turns of said coil extending around said element and also around said virtual center line thereof, means for selectively sending in-rush electric current in one direction through said coil to provide in-rush unidirectional electromagnetic field approximately parallel to, and in the opposite direction to the permanent magnet field of said element and of sufficient intensity thereby to reduce permanently the permanent magnetic field in one direction outside and between the ends of said element for reducing the useful magnetomotive force between the effective ends of said pole pieces, and for sending in-rush electric current in another direction through said coil to provide in-rush unidirectional electromagnetic field in approximately the same path as, at least the same intensity as but in the opposite direction to the first mentioned electromagnetic field thereby to restore said element to at least its original magnetic condition thereby to permanently restore said magnetomotive force to at least its original value.

4. The method for controlling the useful magnetomotive force across a working air gap between a plurality of pole pieces of comparatively low coercivity, said pole pieces being operatively coupled with permanent magnet means supplying said magnetomotive force and having a coercivity of at least 480 ampere turns per inch; comprising electrically reversing the magnetic polarity of only a sufficient portion of said means to reduce said magnetomotive force across said gap by at least 75% and then electrically reversing the magnetic polarity of only a sufficient portion of said means, whose magnetic state has been so modified, to increase the magnetomotive force across said gap to at least its original value.

5. The method for controlling the useful magnetomotive force across a working air gap between a plurality of pole pieces of comparatively low coercivity, said pole pieces being operatively coupled with permanent magnet means supplying said magnetomotive force and having a coercivity of at least 480 ampere turns per inch; comprising subjecting said means to an in-rush unidirectional electromangetic field approximately parallel and in opposition to the magnetic field of said means and of such intensity as to reverse the magnetic polarity of only a sufficient part of said means to decrease said magnetomotive force across said gap by at least 75% and then subjecting said means, whose magnetic state has been so modified, to an in-rush electromagnetic field in approximately the same path, as of at least the same intensity as and in a direction opposite to that of said first mentioned electromagnetic field to reverse the magnetic polarity of only said part of said so modified means to increase said magnetomotive force across said gap to at least its original value.

6. A device comprising permanent magnet means composed of magnetic material having a coercive force of at least 480 ampere turns per inch, a plurality of pole pieces spaced from each other and composed of magnetic material of comparatively low coercive force, said pole pieces operatively coupled with said means and defining a working air gap across which is a magnetomotive force supplied thereto by said means, and means adapted to reverse the magnetic polarity of only a portion of said permanent magnet means sufficient to decrease by at least 75% said magnetomotive force across said working gap, and means adapted to reverse the magnetic polarity of that portion of said permanent magnet means, whose magnetic state has been so modified to increase said magnetomotive force across said gap to at least its original value.

7. A device comprising permanent magnet means composed of magnetic material having a coercive force of at least 480 ampere turns per inch, a plurality of pole pieces spaced from each other and composed of magnetic material of comparatively low coercive force, said pole pieces operatively coupled with said means and defining a working air gap across which is a magnetomotive force supplied thereto by said means, second means adapted to subject said permanent magnet means to an in-rush electromagnetic field to reverse the magnetic polarity of only a portion thereof sufficient to decrease by at least 75% said magnetomotive force across said gap, and third means adapted to subject said permanent magnet means, whose magnetic state has been so modified, to an in-rush electromagnetic field to reverse the magnetic polarity of only a portion thereof sufficient to increase said magnetomotive force across said gap to at least its original value.

8. A device defined in claim 7, with each of said second and third means comprising a resistance whose resistivity at incandescent temperature is many times that at normal temperature, a coil and a source of direct current adapted to be connected in series relationship to make a circuit whereupon in-rush current flows through said coil to create its in-rush electromagnetic field and also flows through said resistance to increase the temperature of said resistance to incandescence practically instantaneously whereupon practically instantaneously thereafter the current in said circuit becomes automatically reduced to a significantly lower amperage value.

9. A device comprising a permanent magnet element composed of material having a coercive force of at least 480 ampere turns per inch, a plurality of pole pieces spaced from each other and composed of magnetic material of comparatively low coercivity, said pole pieces operatively coupled with said element and defining a working air gap across which a magnetomotive force is supplied thereto by said element, means adapted to reverse the magnetic polarity of only a portion of said element, said portion extending substantially the full length thereof and inwardly from substantially its entire outside surface between the ends thereof only a distance sufficient to decrease by at least 75% said magnetomotive force supplied by said element across said gap, and means for restoring said element to at least its original magnetic condition to restore said magnetomotive force supplied thereto by said element to at least its original value.

10. The method for operating a lifting device comprising permanent magnet means composed of material having a coercive force of at least 480 ampere turns per inch and a plurality of pole pieces spaced from each other, composed of material of comparatively low coercivity, operatively coupled to with said means and defining a working air gap across which a magnetomotive force is supplied thereto by said means, a load in said gap and magnetically coupled with said pole pieces by said magnetomotive force whereby said load is retained by said device; comprising electrically reversing the magnetic polarity of a sufficient portion of said means to reduce the magnetomotive force across said gap to a value insufficient to retain said load whereby said load is released from said device, then while in closed circuit with another load, electrically reversing the magnetic polarity of a sufficient portion of said means, whose magnetic state has been so modified, to increase the magnetomotive force supplied by said means across said gap to at least its original value whereby said other load is retained by said device.

References Cited

UNITED STATES PATENTS

| | | | |
|---|---|---|---|
| 2,442,638 | 6/1948 | Cioffi | 317—201 |
| 1,398,526 | 11/1921 | Luzy | 317—203 |
| 2,115,795 | 6/1938 | Warnke | 317—201 |
| 2,359,293 | 10/1944 | Beechlyn | 317—159 |
| 1,956,279 | 4/1934 | Godsey | 317—201 |
| 2,884,698 | 5/1959 | Wursch | 317—159 |
| 2,536,824 | 1/1951 | Sontheim | 317—201 |
| 744,481 | 11/1903 | Campbell | 317—158 |
| 1,444,299 | 2/1923 | Benner | 317—203 |
| 1,997,193 | 4/1935 | Kato | 317—201 |
| 3,089,064 | 5/1963 | Bennetot | 317—123 |
| 2,275,839 | 3/1942 | Boehne | 317—159 |
| 2,348,967 | 5/1948 | Duby | 317—159 |
| 2,082,121 | 6/1937 | Rypinski | 317—132 |
| 1,252,312 | 1/1918 | Warren | 317—171 |
| 2,130,870 | 9/1938 | Boehne | 317—171 |
| 2,188,803 | 1/1940 | Boehne | 317—171 |
| 1,853,642 | 4/1932 | Simmons | 317—123 |
| 2,000,378 | 5/1935 | Deisch | 336—110 |
| 2,046,962 | 7/1936 | Mott | 317—41 |

FOREIGN PATENTS

| | | |
|---|---|---|
| 874,330 | 9/1951 | Germany. |
| 73,046 | 7/1936 | Denmark. |

GEORGE HARRIS, *Primary Examiner.*

U.S. Cl. X.R.

335—284, 285